Dec. 26, 1939.  A. J. L. HUTCHINSON  2,184,596
PROCESS OF TREATING GASES
Filed April 14, 1937
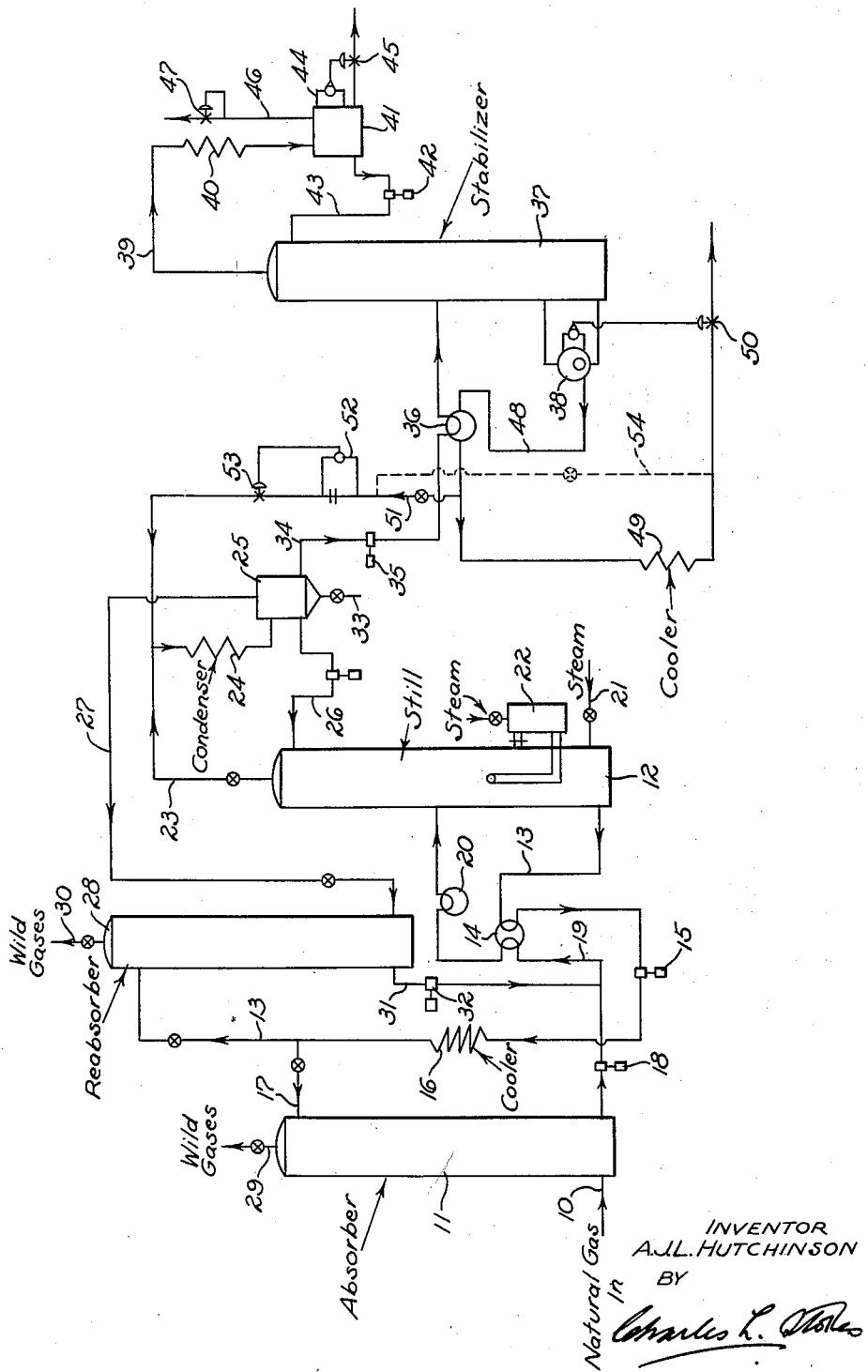
INVENTOR
A.J.L. HUTCHINSON
BY
Charles L. Stokes
ATTORNEY.

Patented Dec. 26, 1939

2,184,596

UNITED STATES PATENT OFFICE 2,184,596

PROCESS OF TREATING GASES

Arthur John Lindsay Hutchinson, Palo Alto, Calif., assignor to The Fluor Corporation, Ltd., Los Angeles, Calif., a corporation of California Application April 14, 1937, Serial No. 136,894

4 Claims. (Cl. 196—8)

This invention relates to a process of treating gases, such as natural gas, still gas, and the like, and has for its principal object the recovery of all the butane and heavier fractions of such gas besides a large percentage of the propane and iso and normal butane, propylene and butylenes substantially free of methane and ethane.

Another object is to so treat natural gas, still gases and the like, as to substantially completely denude the same of desired easily liquefiable fractions, as well as a large percentage of the propane-propylene and butane-butylene fractions, by the well known absorption system, while at the same time a portion of said easily liquefiable fractions shall be used in the system to eliminate costly and inefficient steps of operation.

A further object is to provide a simplified and highly efficient process for the use, with absorption media, in the recovery of natural gas gasoline, and additional fractions comprising propane-propylene and butane-butylene.

Further objects will become apparent as the invention hereinafter becomes more fully disclosed.

In the diagrammatic sheet of drawings, gas such as natural gas consisting of a mixture of methane, ethane, propane, butane and heavier hydrocarbons, is introduced through pipe 10 into the bottom of an absorber 11 to flow opwardly therethrough while meeting a downward flow therein of a menstruum suitable for absorbing desired hydrocarbons from the gas.

Said menstruum being liquid hydrocarbons of suitable specification may be provided from any source, but is preferably drawn from the bottom of still, or stripper 12, through pipe 13, being partially cooled in heat exchanger 14 and then forced by pump 15 through a cooler 16 and branch pipe 17 into the top of absorber 11.

The types of absorption media most suitable for stripping the gas in absorber 11, as well as the temperature and pressure for most efficient absorption, are well known in the art and, in general, it suffices to say that the absorption oil should be of higher boiling range than that of the hydrocarbons to be absorbed while at temperatures ranging from 50° F. to 100° F. under a pressure of from 10# to 900# per square inch.

The more or less saturated absorption oil is withdrawn from the bottom of absorber 11 by pump 18 and forced through pipe 19, heat exchanger 14 and preheater 20 into still 12 at about its middle portion wherein it undergoes distillation for the separation of absorbed hydrocarbons from the absorption oil which may or not be accompanied by the use of open steam introduced through pipe 21.

Still 12 may be of a well known type of column or plate still in which the liquids to be distilled are heated before entering the still or in any other suitable manner and which also may contain a steam heated reboiler such as shown at 22.

The distillation vapors and gases pass through pipe 23 and condenser 24 to accumulator 25, a portion of the condensed vapors being taken thence through pipe 26 to be used as reflux in the top of still 12.

"Wild gases," such as methane, ethane and the like, undesired in the final product but containing small portions of desired hydrocarbons, are drawn from the top of accumulator 25 through pipe 27 and passed into the bottom of a reabsorber 28 supplied with cooled absorption oil through pipe 13.

Wild gases may be withdrawn from absorber 11 and reabsorber 28 through pipes 29 and 30, respectively, while absorption oil, more or less saturated, is taken from the bottom of reabsorber 28, through pipe 31, and forced by pump 32 into pipe 19 and thus into still 12 to be stripped of desired hydrocarbons.

Up to the described step of obtaining a condensate in accumulator 25 from which any condenser steam may be withdrawn through pipe 33, the so far described process is known in the art. Where it is only desirable to extract the pentanes and heavier hydrocarbons from the gas with a relatively small amount of the butane content therein, the condensation in condenser 24 is relatively complete, but where a relatively large amount of oil is circulated in order to remove substantially all of the butane-butylene fraction and a large percentage of the propane-propylene fraction, the large volume of so-called fixed gases, methane and ethane, as well as the large percentage of difficultly condensable propane-propylene in condenser 24 prevents condensation, except to a very small degree, taking place.

In consequence, when extracting propane-propylene and butane-butylene in large amounts, a large volume of gas, uncondensable under the operating conditions, together with condensable vapors, are continually recycled from accumulator 25 back through pipe 27 and reabsorber 28, resulting in practically useless work.

While this might primarily be considered a question of capacity, yet without changing the capacity of a present known plant, the purpose of obtaining a final increased percentage of desired hydrocarbons is accomplished by this invention and useless work is eliminated by introducing into condenser 24 a product substantially free of propane-propylene, as an absorption medium for and together with the vaporous mixture to be condensed.

The result of this may be better understood if the absorption medium introduced into condenser 24 is a stabilized gasoline substantially free from methane, ethane, propane-propylene, derived by passing all or part of the condensate from accumulator 25 through pipe 34, pump 35 and heat exchanger 36 into stabilizing column 37.

Stabilizer 37 is of a well known type in which a hydrocarbon mixture is adapted to be fractionated to yield a product having a designated vapor pressure. To accomplish this, it is considered that stabilizer 37 is of a type having a reboiler 38 adapted to distil all undesired fractions as overhead through pipe 39 which are condensed in condenser 40 and gathered in receiver 41, whence a portion is forced by pump 42 through pipe 43 to serve as reflux in the top of stabilizer 36.

Receiver 41 may be fitted with a liquid level control 44 governing valve 45 through which excess condensate may be withdrawn and also with a pipe 46 for incondensable gases having a pressure control valve 47.

The result of such stabilization step is a liquid hydrocarbon product which, in the ordinary course of events in well known processes, is passed through pipe 48, heat exchangers 36, cooler 49 and level controlled valve 50 to storage.

Under certain methods of operation it might be desirable to use the product from accumulator 25 directly as finished product to storage, in which case the condensate passed through valve 45 from the stabilizer should be blended with this product to storage. Under this method of operation only sufficient product from accumulator 25 would be taken through pump 35, heat exchanger 36, into stabilizer 37 to give the desired quantity of absorbing medium to be introduced into condenser 24. By the improved steps of this invention a portion or all of the thus stabilized product, depending upon the method of operation, is taken from pipe 48 and passed through pipe 51, flow controller 52 and control valve 53 to meet the vaporous mixture coming through pipe 23, to be mixed therewith and passed through condenser 24.

Alternatively, depending on several variables such as final product required, composition of entering gas, temperature of condenser 25, pressures, etc., a portion of the final product may be passed, after cooler 49, through pipe 54, while pipe 51 is shut off. Or a portion of the final product may be supplied partly through pipe 51 and partly through pipe 54.

In ordinary operation of the improved process the pressure in accumulator 25 may be from about 50 to 100# per square inch, gauge, while stabilizer 37 may operate under gauge pressures as high as 450 pounds, all which change somewhat with the above mentioned variables.

If it be assumed that the final product thus introduced into condenser 24 is substantially free of propane and lighter hydrocarbons, it will be appreciated that sufficient pentane and heavier hydrocarbons are returned to condenser 24 so that its efficiency is increased to give highly increased condensation of propane, butane and heavier constituents and the volume of gases returned to reabsorber 28 is consequently greatly decreased.

In this manner the stabilized product is not only useful for an absorption medium but the recovery of propane and butane from stabilizer 37 is rendered much more certain and cheaper, over known processes utilizing the ordinary large volumes of absorption oil through the reabsorber and other required special fractionating cycles.

The heat of absorption is small and is taken out in condenser 24. In absorbing this material, the heat of condensation of the propane-butane is not increased, so the total heat load on condenser 24, assuming these constituents could be condensed without the introduction of the stabilized media as absorbent, is not increased. The only additional heat load required is that lost by inefficiency in heat exchange in exchanger 36 on the product recycled.

I claim as my invention:

1. The process of treating gases, which comprises: flowing a stream of relatively light and heavy gaseous hydrocarbons through an absorption medium to extract therefrom hydrocarbons liquefiable at the operating temperatures and pressures, distilling the mixture to remove the absorbed hydrocarbons, condensing removed hydrocarbons, stabilizing the condensed hydrocarbons, and adding a portion of the stabilized hydrocarbons in cooled and liquid form to the hydrocarbons undergoing condensation to increase the ratio of the liquefied heavier constituents to the liquefiable lighter constituents with respect to their ratio in the absorption medium prior to distillation.

2. In a continuous process of condensing hydrocarbon vapors from an absorption oil heavier than gasoline, the steps of removing from the rich oil the absorbed constituents, condensing said constituents, stabilizing the condensate, and recycling so much of said stabilized condensate as may be desired by returning it to the locus of condensation to aid in the condensation of the desired constituents, whereby the stabilized condensate, being heavier than the material absorbed by the oil, may be recycled in such amount as to yield a condensation just sufficiently short of total condensation as not to result in an undesired drop of pressure in the distillation and condensation system.

3. In a continuous process of the character described, the steps of stripping a rich absorption oil of its hydrocarbon gases and vapors including from methane to constituents suitable for gasoline by distillation at a temperature lower than the boiling point of the absorption oil, condensing the distilled hydrocarbons, removing from such condensate all methane and ethane, and recycling a portion of such stabilized condensate by returning it to the zone of condensation.

4. In a process of the character described the steps of bringing a stream of hydrocarbon gases including from methane to desired gasoline constituents into intimate contact with an absorbent oil, stripping the enriched oil by subjecting it to a temperature and pressure to distil the desired gasoline constituents from the oil, condensing said desired constituents, rectifying the condensate by removal of substantially all of the propane and lighter hydrocarbons, and returning a portion of such stabilized gasoline to the locus of said condensation thereby to minimize losses caused by recycling excess volumes of gases.

ARTHUR JOHN LINDSAY HUTCHINSON.